United States Patent [19]
Leopoldi

[11] 3,774,309
[45] Nov. 27, 1973

[54] STEEL MEASURING TAPE HOLDER

[76] Inventor: Norbert Leopoldi, 4180 Marine Dr., Chicago, Ill. 60613

[22] Filed: June 19, 1972

[21] Appl. No.: 264,300

[52] U.S. Cl.................. 33/138, 206/52 R, 242/84.8
[51] Int. Cl........................... G01b 5/02, G01b 3/10
[58] Field of Search...................... 242/84.8; 33/138; 206/52 R, 78 B

[56] References Cited
UNITED STATES PATENTS

| | | | |
|---|---|---|---|
| 1,708,725 | 4/1929 | Huempfner | 206/52 R |
| 1,986,551 | 1/1935 | Anderson | 33/138 |
| 2,956,795 | 10/1960 | Foster | 33/138 X |

*Primary Examiner*—George F. Mautz
*Assistant Examiner*—Edward J. McCarthy
*Attorney*—Robert C. Brown, Jr. et al.

[57] ABSTRACT

A steel measuring tape holder for a self-winding coiled steel tape of conventional design wherein the holder is of simple design readily fabricated of plastic but capable of being made of other materials and adapted to contain the coiled steel tape and permit ready uncoiling of the tape in the withdrawal thereof out of the holder for measuring while guiding the tape for extension in a straight line through a guide opening contoured in conformity with a curved face of the tape on one side and having a complemental guide member at the opposite side of the tape to initiate the straight line withdrawal of the tape from the holder and having a projecting guide lip which limits retraction of the tape and enables easy grasp of the tape for withdrawal from the holder.

8 Claims, 5 Drawing Figures

Patented Nov. 27, 1973 3,774,309
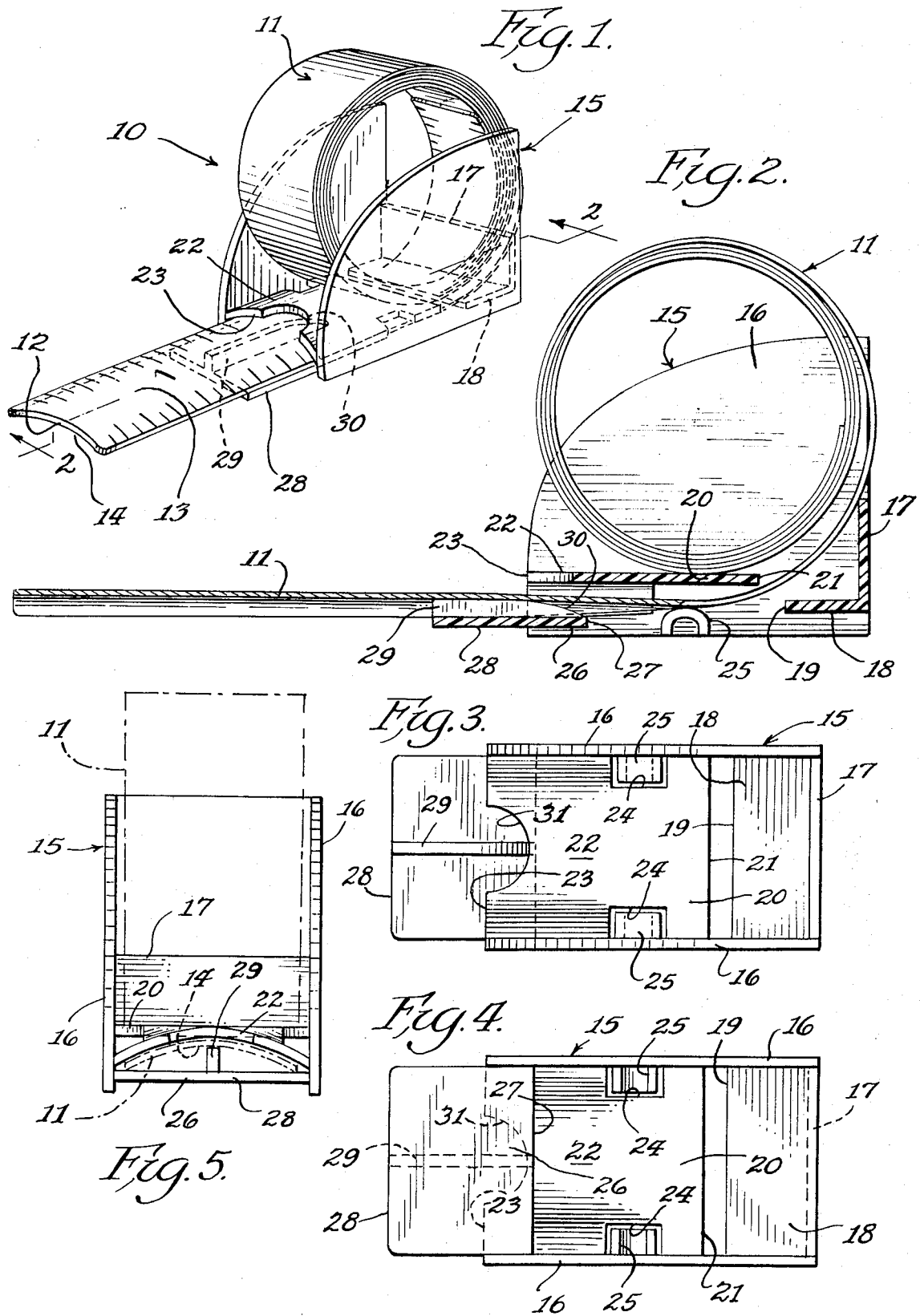

STEEL MEASURING TAPE HOLDER

BACKGROUND OF THE INVENTION

Steel measuring tapes have been enclosed in casings or housings which comprised simple box-like structures of rectangular form or having rounded portions and provided with an opening through which the measuring tape was withdrawn from the housing. The steel measuring tapes were self-coiling so that the opposite ends of the tape required stops or abutment-like end members to prevent the tapes from being drawn entirely from the housing and conversely prevent the tape from recoiling entirely into the housing. Such steel measuring tapes have been fabricated from a steel ribbon formed into a spiral coil and stressed to return to a coiled condition when released. Some such steel measuring tapes have included ribbons of curved cross section which rigidified the tape measure when extended and increased the tendency for the steel tape to return to its normally coiled condition. The curved cross section tapes were constructed to coil into a spiral with the convex face of the steel tape disposed toward the center of the coil and the concave side of the tape disposed to face away from the center of the coil. The coiled steel measuring tapes of the type mounted in a housing, as revealed in the prior art, were designed for permanent association with the enclosing housing and were not normally separable from such enclosures. One end of the steel tape could be pulled from the housing for a certain length depending upon the size of the tape measure, but it could not be separated entirely from the enclosure.

OBJECTS OF THE INVENTION

It is the principal object of this invention to provide a holder for a self-coiling steel measuring tape adapted to receive a coiled steel measuring tape of typically standard design nd construction which may readily be inserted in the holder or removed therefrom.

Another object of the invention is to provide a holder for a steel measuring tape of curved cross section and having portions for containing the coiled steel tape and for guiding the tape to move in a straight line outwardly of the holder.

A further object of the invention is to provide a holder for a steel measuring tape having a projecting guide lip adapted to prevent total retraction of the measuring tape into the holder and provide a partially extended portion of the tape at all times to enable grasp of the tape end portion for straight line withdrawal from the holder for measuring.

A still further object of the invention is to provide a steel measuring tape holder for a steel ribbon tape of curved cross section coiled in the holder and having an exit opening conforming to at least one surface of the curved tape section.

Still another object of the invention is to provide a steel measuring tape holder for a tape of curved cross section coiled in the holder and having a guideway including a coil separating portion and an exit opening having one side conforming to the convex surface of the curved cross section, and guide means engaging the opposite concave side of the tape to steady and direct the tape in a straight line during withdrawal from the holder.

A specific object of the invention is to provide a holder for a steel measuring tape which is adapted for manufacture economically from plastic having spaced side walls connected by a partial rear wall and a partial bottom wall to define an open top container for the coiled steel tape, and having a bottom guide wall connecting the side walls in spaced relation from the partial bottom wall including a curved exit wall portion conforming to a convex surface of the tape, and a bottom lip portion connecting the side walls and projecting beyond the curved exit wall with an upstanding tapered central guide member engaging the concave side of the steel tape.

DESCRIPTION OF THE DRAWINGS

The foregoing and other and more specific objects of the invention are attained by the measuring tape holder constructed in accordance with the accompanying drawings wherein:

FIG. 1 is a perspective view of a measuring tape holder fabricated from plastic according to this invention showing a coiled steel tape contained in the holder and projecting partially therefrom;

FIG. 2 is a view in longitudinal section through the measuring tape holder taken as indicated by the line 2—2 of FIG. 1 and also showing a coiled steel tape contained in the holder and projecting partially therefrom;

FIG. 3 is a top plan view of the measuring tape holder with the steel tape removed;

FIG. 4 is a bottom plan view of the measuring tape holder also shown with the steel tape removed; and FIG. 5 is a front elevational view of the measuring tape holder with the coiled steel tape indicated in phantom lines.

SUMMARY OF THE INVENTION

This invention is represented by a generally open type holder for a self-coiling steel measuring tape of typically standard construction wherein the steel tape is fabricated from a steel ribbon of arcuate cross section incorporating built-in stresses which cause the tape to assume a normally coiled condition. The coiled steel tape winds itself into a relatively tight spiral and the holder is designed to contain the coiled tape and to facilitate the unwinding of the coil and guide the steel tape in a straight line as it is unwound from the coil and withdrawn from the holder. The measuring tape holder is of generally open type construction so that the coiled steel tape is readily inserted therein and may easily be removed therefrom and is visible generally in its entirety at all times.

The coiled steel tape is contained between spaced side walls of the holder and partial end bottom walls ensure positioning of the coil to facilitate the unwinding of the tape and entrance thereof into the guideway of the tape and entrance thereof into the guideway leading to the exit opening through which the tape is withdrawn. The guideway for the tape and the exit opening include a plurality of elements, all of which cooperate to ensure straight line withdrawal of the steel tape from the holder. A bottom guide wall spaced from the partial bottom wall serves to separate the exiting tape portion from the spiralled coils, with the tape passing between the partial bottom wall and the bottom guide wall. A pair of formed guide brackets projecting inwardly from the respective side walls prevent the uncoiling steel tape from passing through the open bottom area of the holder and cause the tape to be retained in the guideway.

The bottom guide wall is generally flat where it acts as a separator for the coils but is shown as being integral with an arcuate guide wall portion which defines one side of the exit opening for the steel measuring tape and engages the convex upper side of the tape as it moves outwardly of the holder. A bottom wall and projecting lip portion is spaced below the arcuate guide wall portion and is provided with a centrally disposed upstanding element adapted to engage the underside or concave portion of the steel tape as it passes ove the projecting lip. The upstanding central member is tapered adjacent its rear portion to facilitate initial entry of the end of the steel tape into the exit passageway. The bottom projecting lip portion serves to prevent the extended steel tape from being pushed entirely into the holder when returning the tape to its coiled condition, and also affords a means of grasping a tape end portion always disposed outwardly of the holder whereby the tape may be withdrawn from the closely fitting exit opening.

DESCRIPTION OF PREFERRED EMBODIMENT

The steel measuring tape holder of this invention as disclosed herein is fabricated from a suitable plastic, constructed as an integral structure affording adequate strength and rigidity while effecting maximum economy, but may be constructed from metal or any other suitable material and assembled as integrated parts or as a unitary structure. The structure fabricated from plastic, however, affords advantages of manufacture in quantities such as to effect the greatest possible economy and thereby enable the holder to be marketed at the greatest cost advantage.

The measuring tape holder assembly 10 is illustrated in FIG. 1 with the coiled steel tape 11 contained in the holder and partially extended. The steel tape 11 comprises the conventional tape of this type having an arcuate cross section, as best shown at 12, which results in an upper surface 13 of convex shape and a bottom concave surface 14. The steel tape 11 is fabricated with built-in stresses which cause the tape normally to assume a coiled condition in a tightly adjacent series of spirals with the convex side 13 disposed toward the inside of the coil. The measuring tape is shown as being marked in gradations of inches and fractions thereof and may be of any length desired but preferably of the typical length of six feet or ten feet with the feet marked off at one foot intervals for convenience in measuring.

The coiled steel tape 11 associates itself with the holder 15 when assembled therewith by means of its own built-in stresses, and when installed in the holder is separable therefrom only by intentional removal. The tape cannot accidentally disengage from the holder since the assembled interengagement between the two elements is such that the tape is positively held in the holder in all operative positions of the tape by the forces exerted by the built-in stresses.

The tape holder 15 may best be described as a generally open type container for the steel tape coil 11 in that it is substantially totally open in the upward and forward directions with the rear side open for a substantial portion of its total area while the bottom side is partially open. The holder includes spaced side walls 16 with the rear and bottom edges straight and at substantially right angles, as best shown in FIG. 2. The top and forward edges of the side walls are formed on a continuous curve, as best shown both in FIGS. 1 and 2. The side walls 16 are spaced apart sufficiently to accommodate the width of the coiled steel tape 11 therebetween without binding or causing any friction, as best indicated in FIG. 5 where the steel tape is illustrated by dot-and-dash lines.

The side walls 16 of the tape holder are connected by an end wall 17 which extends between and is integrated with the side walls substantially flush with the rear edges of the side walls. The end wall 17 is continuous between the side walls of the holder but extends upwardly only a portion of the height of the side walls, and the top edge of the end wall is located relative to the coiled steel tape to act somewhat as a guide surface to position the outermost steel coil of the tape 11 as it winds and unwinds during the operation of the tape between extended and retracted positions in actual use.

The end wall 17 is shown as being integrated with a bottom wall 18 which is disposed horizontally and spaced above the bottommost edge of the side walls 16, as best shown in FIG. 2. This bottom wall extends forwardly from its connection with the rear wall 17 only a relatively small distance toward the front of the tape holder and the forward edge 19 of the bottom wall forms one side of an opening for the passage of the unwinding steel tape coil 11 as it is withdrawn from the holder for measuring. Thus, the wall 18 comprises only a partial bottom wall covering only a small portion of the bottom area of the holder 15.

The other side of the opening for passage of the unwinding steel measuring tape 11 is formed by the rear edge 21 of a bottom guide wall 20, also as best shown in FIG. 2. The guide wall 20 is spaced above the level of the bottom wall 18 and the rear edge 21 thereof is spaced forwardly of the front edge 19 of the bottom wall, thus creating the opening for passage of the steel tape 11. The bottom guide wall 20 is flat and extends between and is integrated with the side walls 16 and is shown as being integral with an arcuate guide wall portion 22 which extends forwardly to a location where the front edge 23 thereof is disposed substantially flush with the front edges of the side walls 16. The arcuate guide wall 22 also extends continuously between and is integrated with the side walls 16, and the transition area between the flat and arcuate guide wall portions 20 and 22 is created by an opening 24 in the guide wall structure adjacent the respective side walls 16, as best revealed in FIGS. 3 and 4. These cut-outs 24 enable the bottom guide wall structure to go from the flat form at 20 to the arcuate form 22 without creating any problems of design or manufacture.

An inwardly extending guide bracket 25, as shown in FIGS. 2, 3 and 4, is integrated with each side wall 16 and is located at each side of the holder 15 substantially within the area of the respective cut-outs 24 so that the guide brackets are aligned at respectively opposite inner sides of the holder side walls. The brackets 25 thus are located forwardly of the front edge 19 of bottom wall 18 and of the rear edge 21 of the flat bottom guide wall 20 defining the opening for the passage of the steel tape 11 so that the brackets are positioned to further guide the tape toward the frontal area of the holder 15 while preventing the tape from escaping through the open bottom area of the holder. The upper surfaces of the brackets 25 are curved to avoid creation of any abutment surfaces which might be engaged by the end of the steel tape 11 and so that the tape will slip over the brackets readily. It will be noted, as best shown in FIG. 2, that the topmost level of the guide brackets 25 is located below the level of the upper surface of bottom wall 18.

Adjacent to the front of the measuring tape holder 5 and located near the bottom thereof is a bottom wall 26 which is substantially flat and extends between and is integrated with the opposite side walls 16. This horizontal bottom wall 26 is located above the bottom edges of the tape holder side walls 16 but below the level of the top surfaces of the guide brackets 25, and as shown in FIG. 2, the upper surface of the wall 26 at the rear edge 27 thereof is located on a line extending therefrom across the tops of the guide brackets 25 to the front edge 19 of bottom wall 18 at the upper surface thereof so that if the tape 11 is in engagement with all three of these surfaces it will be be substantially in a straight line. When the tape 11 is being pushed back into the holder 15 from an extended position, the outermost coil of the spirally wound tape in all probability will come into guiding contact with the bottom wall edge 19 at the upper surface corner thereof and will be guided thereby and by the upper edge of the rear wall 17 at the inner surface thereof during the winding up of the steel measuring tape.

The bottom wall 26 forms part of the guideway for the steel tape 11 during its movements in and out of the holder 15 and is illustrated as being integral with a bottom lip portion 28 which projects outwardly of the forward edge of the holder, as best shown in FIGS, 2, 3, and 4. This forwardly projecting lip portion acts as a guide surface for the steel tape and provides an extension beyond the forward face of the holder which functions as a limit stop to the inward pushing of the tape measure where it is being retracted. The steel tape must be retracted by hand and, when pushing the last portion of the extended tape back into the holder, the front edge of the projecting lip 28 will be engaged and it will serve to prevent the tape from being pushed further into the holder. The projecting lip also ensures that an adequate portion of the steel tape will always be available and convenient to be grasped and pulled from the holder 15 for use. Since the end of the steel tape 11 normally will always lie coincident with the front end of the projecting lip 28, there will always be a sufficient length of the tape extending out of the holder beyond the front face thereof to enable the tape to be withdrawn from the holder merely by taking hold of that portion of the tape lying on the projection 28 and pull whatever amount of tape out of the holder 15 necessary to make the measurement at hand.

The projecting lip 28 is rigidified by an integral upstanding central rib-like guide member 29 disposed on the upper side of the projecting lip and extending continuously in a lengthwise direction across the full extent of the lip 28 and the bottom wall 26. The rear portion of the member 29 overlying the wall 26 is tapered, as indicated at 30 (see FIGS. 1 and 2) and this tapered portion acts to lift and guide the end of the steel tape portion 11 onto the bottom wall 26 and across the projecting lip 28. It will be seen, particularly from FIGS. 1, 2 and 5, that the upstanding guide member 29 extends into and engages under the concave bottom side 14 of the steel tape 11 so that the assemblage comprising the bottom wall 26, the projecting lip 28 and the upstanding rib 29 thereon, when considered in combination with the overlying arcuate guide wall 22, defines an exit opening from the holder 15 for the tape 11 and which conforms substantially to the respectively convex and concave top and bottom surfaces of the curved section steel tape which is thus closely guided thereby as the tape is moved outwardly of the holder.

As hereinbefore described, the steel tape 11 of arcuate cross section is fabricated with built-in stresses so that the ribbon-like tape normally assumes the coiled form illustrated herein consisting of a plurality of somewhat tightly engaged spiral coils which are unwound as the measuring tape is withdrawn from the holder 15 and which rewind automatically when the extended tape is pushed into the holder. The coiled steel tape is contained in the holder between the side walls 16 and normally engages the rear wall 17 while being supported on the upper surface of the bottom guide wall 20. The mounting or insertion of the steel tape 11 into the tape holder 15 is most clearly revealed in FIG. 2 where it can be seen that, with the coiled tape contained between the side walls 16, the leading end of the tape is fed downwardly at the inner side of the end wall 17, through the opening between the front edge 19 of the bottom wall 18 and the rear edge 21 of the bottom guide wall 20 and over the side guide brackets 25, and thus into the guideway leading to the exit opening defined by arcuate guide wall 22 leading from the bottom guide wall 20, both overlying the steel tape, and the bottom supporting guide wall 26 for the tape taken with the integral lip portion 28 and upstanding guide rib 29.

With the steel measuring tape thus threaded through this passageway and onto the projecting lip 28, it will be seen that the tape 11 can readily be withdrawn from the holder 15 and that, as the tape passes into the guideway, it is straightened out from its coiled condition and caused to issue through the exit opening in a straight line to provide a rigid measuring rule of any chosen length within the total length of the tape. The built-in stresses incorporated in the steel tape as manufactured results in a cooperative relationship between the tape and the holder which precludes any possibility of the tape accidentally escaping from the holder. These stresses cause the development of sufficient resistance to relative movements between the tape 11 and holder 15, other than movements which are normal to the operation of the tape for measuring, so that the tape cannot accidentally be dislodged but must intentionally be moved through the holder.

The front edge 23 of arcuate guide wall 22 is formed with a cut out area 31 to provide clearance for grasping the exposed end of the steel tape 11 which lies on the outwardly projecting lip 28 and thereby facilitate the withdrawal of the tape through the exit opening from the holder 15.

The dimensions of the measuring tape holder 15 are such as to conform to standards which have been established in this field generally and have become more or less universally adhered to since being adopted as the suggested norm. The present steel measuring tape holder, as best shown in FIGS. 2, 3 and 4, is made of a size such that the dimension of the base area comprising what has been described as the bottom side of the holder has a length from the rear side at the wall 17 to the front edge of the projecting lip 28 of exactly two inches. This conforms to the established practice and enables a user to take this 2-inch dimension into consideration when making a measurement where the edge of the holder at the rear wall 17 is utilized as the base point from which a measurement is taken. Thus, by adding the two inches represented by the length of the holder and projecting lip, the user can readily arrive at the exact dimension of the measurement being taken.

From the foregoing, it can be seen that a steel measuring tape holder has been provided for a coiled tape of more or less conventional design which is economical of manufacture, and of a design adapted readily to be operatively associated with such tapes and such as effectively to confine the coiled tape for positive extension only as intended and retraction only by intent, with the steel tape always assuming a rigid straight line measuring position in its extended condition, and automatically assumes a spirally wound condition when manually retracted, and which conforms to established standards more or less universal in this field.

The embodiments of this invention in which an exclusive property or privilege is claimed are defined as follows:

1. A holder for a steel measuring tape of arcuate cross section and self-coiling to assume a normally coiled relationship, said holder having a pair of spaced side walls, a rear wall connecting said side walls at the rear end of said side walls, said rear wall being of less than full height of the side walls, the rear, front and top areas of said holder being generally open between said side walls substantially to expose a coiled steel tape mounted in the holder, a bottom guideway in the holder disposed between said side walls and extending to an exit opening for the steel tape adjacent the forward end of said side walls, said coiled steel tape being contained between said spaced side walls and having a portion entered through said guideway and passing through said exit opening, a bottom wall connecting said side walls extending forwardly from said rear wall and terminating in an edge defining one side of an opening to said guideway, and a bottom guide wall connecting said side walls and defining one wall surface of said guideway, said bottom guide wall at its rear edge defining the other side of said opening to said guideway and at its forward edge defining one side of said exit opening.

2. A holder for a steel measuring tape as set forth in claim 1 wherein a portion of said bottom guide wall adjacent to said exit opening is of curved cross section conforming to a convex surface of said steel tape.

3. A holder for a steel measuring tape as set forth in claim 1 wherein a horizontal bottom wall connecting said side walls is disposed below said bottom guide wall in spaced relation thereto and defines the other side of said exit opening.

4. A holder for a steel measuring tape as set forth in claim 2 wherein a horizontal bottom wall connecting said side walls is disposed below said bottom guide wall in spaced relation thereto and defines the other side of said exit opening, and means on said horizontal bottom wall extending upwardly into the concavity at the underside of the arcuate section steel tape.

5. A holder for a steel measuring tape as set forth in claim 4 wherein said means on said horizontal bottom wall extends from the front edge of the horizontal bottom wall to adjacent the rear edge thereof and is tapered downwardly as it approaches said rear edge to facilitate entry of an end portion of the steel measuring tape into said exit opening.

6. A holder for a steel measuring tape as set forth in claim 3 wherein said horizontal bottom wall projects beyond the forward edge of said side walls and provides a supporting lip outwardly of said exit opening for an end portion of said steel tape.

7. A holder for a steel measuring tape as set forth in claim 6 wherein an upstanding rigidifying rib is disposed on said supporting lip and horizontal bottom wall and extends continuously from the front edge of the supporting lip to the rear edge of the horizontal bottom wall, said upstanding rib tapering downwardly adjacent said rear edge of the horizontal bottom wall.

8. A holder for a steel measuring tape as set forth in claim 1 wherein an inwardly projecting guide bracket is provided on each said side wall extending under and guiding said steel tape toward said exit opening.

* * * * *